(12) United States Patent
Rotem et al.

(10) Patent No.: US 10,498,835 B2
(45) Date of Patent: Dec. 3, 2019

(54) CLOUD SERVICES DISCOVERY AND MONITORING

(71) Applicant: Avanan Inc., Great Neck, NY (US)

(72) Inventors: Roy Rotem, Tel Aviv (IL); Avraham Zelovich, Tel Aviv (IL); Gil Friedrich, Great Neck, NY (US)

(73) Assignee: Avanan Inc., Great Neck, NY (US)

( * ) Notice: Subject to any disclaimer, the term of this patent is extended or adjusted under 35 U.S.C. 154(b) by 117 days.

(21) Appl. No.: 15/341,006

(22) Filed: Nov. 2, 2016

(65) Prior Publication Data

US 2017/0134506 A1    May 11, 2017

Related U.S. Application Data

(60) Provisional application No. 62/253,151, filed on Nov. 10, 2015.

(51) Int. Cl.
*H04L 29/08*    (2006.01)

(52) U.S. Cl.
CPC .............. *H04L 67/16* (2013.01); *H04L 67/10* (2013.01)

(58) Field of Classification Search
CPC . H04L 41/5032; H04L 41/5096; H04L 43/06; H04L 67/16; H04L 67/10; H04L 63/08; H04L 12/1818; G06F 2209/547; G06F 9/546; G06Q 10/107
See application file for complete search history.

(56) References Cited

U.S. PATENT DOCUMENTS

| | | | | |
|---|---|---|---|---|
| 7,917,912 B2* | 3/2011 | Gershinsky | ........... | H04L 67/327 709/204 |
| 8,122,144 B2* | 2/2012 | Borgendale | ............ | G06F 9/546 370/216 |
| 8,296,778 B2* | 10/2012 | Bhogal | ................... | G06F 9/546 719/315 |
| 8,327,381 B2* | 12/2012 | Borgendale | ............ | G06F 9/546 709/206 |
| 8,676,876 B2* | 3/2014 | Dekel | ................... | H04L 51/066 709/201 |
| 8,695,015 B2* | 4/2014 | Borgendale | .......... | G06Q 10/107 709/205 |
| 8,850,451 B2* | 9/2014 | Bhogal | .................. | G06F 9/541 709/206 |
| 8,862,869 B1* | 10/2014 | Soon | ................... | H04L 63/0428 713/153 |
| 9,137,131 B1 | 9/2015 | Sarukkai et al. | | |
| 9,465,668 B1* | 10/2016 | Roskind | ............... | G06F 9/5072 |

(Continued)

OTHER PUBLICATIONS

PCT/US2016/059969, International Search Report and Written Opinion, dated Jan. 24, 2017, 7 pages.

*Primary Examiner* — Todd L Barker
(74) *Attorney, Agent, or Firm* — Soquel Group I.P Ltd.

(57) ABSTRACT

A system for shadow IT discovery, including a message monitor monitoring an enterprise messaging service that provides communication between users belonging to the enterprise and cloud services, and discovering a message relating to a specific cloud service, a message analyzer analyzing the message discovered by the message monitor to determine (i) the nature of the specific cloud service, and (ii) one or more enterprise users who use the specific cloud service, and a reporter reporting the results of the message analyzer to an administrator of the enterprise.

6 Claims, 3 Drawing Sheets

(56) References Cited

U.S. PATENT DOCUMENTS

| | | | |
|---|---|---|---|
| 9,633,127 B2* | 4/2017 | Baessler | G06F 16/958 |
| 2004/0093515 A1* | 5/2004 | Reeves, Jr. | H04L 63/0807 |
| | | | 726/10 |
| 2007/0149174 A1* | 6/2007 | Torvinen | H04M 15/00 |
| | | | 455/412.1 |
| 2009/0006559 A1* | 1/2009 | Bhogal | G06Q 10/107 |
| | | | 709/206 |
| 2014/0259093 A1* | 9/2014 | Narayanaswamy | H04L 67/20 |
| | | | 726/1 |
| 2014/0310392 A1* | 10/2014 | Ho | H04L 69/16 |
| | | | 709/223 |
| 2015/0019735 A1* | 1/2015 | Pogrebinsky | G06F 17/3089 |
| | | | 709/226 |
| 2015/0135302 A1 | 5/2015 | Cohen et al. | |
| 2015/0264022 A1 | 9/2015 | Manvi et al. | |
| 2016/0063512 A1* | 3/2016 | Greenspan | G06Q 30/0201 |
| | | | 705/7.29 |
| 2016/0065616 A1* | 3/2016 | Srikanth | G06F 21/62 |
| | | | 726/1 |
| 2016/0127407 A1* | 5/2016 | Mankovskii | H04L 63/1433 |
| | | | 726/1 |
| 2016/0275303 A1* | 9/2016 | Narayanaswamy | G06F 21/6218 |
| 2016/0277368 A1* | 9/2016 | Narayanaswamy | G06F 21/6218 |
| 2018/0027006 A1* | 1/2018 | Zimmermann | H04L 63/1425 |

\* cited by examiner

CLOUD SERVICES DISCOVERY AND MONITORING

PRIORITY REFERENCE TO PROVISIONAL APPLICATIONS

This application is a non-provisional of U.S. Provisional Application No. 62/253,151, entitled MONITORING AND DISCOVERING APPLICATIONS USING NOTIFICATION METHODS, and filed on Nov. 10, 2015 by inventors Roy Rotem, Avraham Zelovich and Gil Friedrich, the contents of which are hereby incorporated herein in their entirety.

FIELD OF THE INVENTION

The present invention relates to information technology monitoring.

BACKGROUND OF THE INVENTION

Organizations need to understand their data and their business processes—how their data is generated, how it is transformed, where it comes from, and where it goes. Organizations also need to know how their employees access, process and use their data and computer applications, and which data applications and data services their employees use. Failure to monitor data, data applications and data services can result inter alia in loss of data, sensitive data leakage, malicious attacks, uncontrolled spending, redundancy and regulatory compliance gaps.

To this end, organizations deploy discovery and monitoring solutions that track their data flows and discover data applications and data services being used by their employees. Conventional discovery and monitoring solutions use network traffic inspectors to analyze and discover data flows, data application transactions and data service transactions into and out of an organization. Conventional discovery and monitoring solutions apply network analysis to gain visibility to data applications that run on their networks. Conventional discovery and monitoring solutions rely on network inspecting entities including routers, switches, firewalls and proxy gateways.

However, these conventional discovery and monitoring solutions suffer from several drawbacks, stemming from the fact that a data application, data service or data flow that is not visible to an organization's network inspecting entities cannot be discovered and monitored.

With the evolution of cloud-based software-as-a-service (SAAS), employees of organizations are adopting cloud solutions without centralized control and even without knowledge of their organizations. Such behavior is referred to as "shadow IT", and arises as users sign up on their own initiatives to data services including inter alia data storage, data applications and messaging services, bypassing information technology (IT) processes, controls and approval of the organizations. Background information about shadow IT is available at https://en.wikipedia.org/wiki/Shadow_IT.

Cloud solutions move data to and from the cloud, which is outside of organization networks, and use applications provided by third parties outside of organization networks. Moreover, employees of organizations use these cloud data applications and data services from their homes and from their mobile devices and interact with these cloud data applications and data services over public networks such as the Internet, and generally the data does not flow through the organizations' network inspection entities. Further complicating discovery and monitoring, cloud services use often encrypted network traffic and, as such, even if the traffic is routed through an organization's network inspection entity, the network inspection entity is unable to determine the nature of the traffic and is thus unable to discover shadow-IT traffic. Furthermore, obtaining network logs from network inspection entities such as firewalls, switches, routers, requires inter alia substantial effort and delegation of access rights, which make such network logs difficult to access.

Reference is made to FIG. 1, which is a prior art system for IT discovery. FIG. 1 shows an enterprise network 100 employing a conventional network traffic inspector 110 to inspect data traffic into and out of an organization, and employees 1-5 of the organization. FIG. 1 also shows an Internet cloud 200 and cloud services 210A, 210B and 210C. For example, cloud services 210A, 210B and 210C may include a collaborative document management service, such as OFFICE 365® developed by Microsoft Corporation of Redmond, Wash., a file sharing service, such as BOX-.NET® developed by Box.net, Inc. of Palo Alto, Calif., and an e-mail service, such as GMAIL® developed by Google Inc. of Mountain View, Calif.

Employees 1, 2 and 5 are working within the organization or within virtual private networks of the organization, and their data traffic is indeed monitored by network traffic inspector 110. Employees 3 and 4, however, are accessing cloud-based services 210A, 210B and 210C directly from locations outside of the organization and, as such, escape monitoring by network traffic inspector 110.

It would this be of advantage to provide robust discovery and monitoring systems and methods that cover today's cloud/SaaS environments.

SUMMARY

Embodiments of the present invention provide robust discovery and monitoring systems and methods that discover and monitor cloud/SaaS environments.

There is thus provided in accordance with an embodiment of the present invention a system for shadow IT discovery, including a message monitor monitoring an enterprise messaging service that provides communication between users belonging to the enterprise and cloud services, and discovering a message relating to a specific cloud service, a message analyzer analyzing the message discovered by the message monitor to determine (i) the nature of the specific cloud service, and (ii) one or more enterprise users who use the specific cloud service, and a reporter reporting the results of the message analyzer to an administrator of the enterprise.

There is additionally provided in accordance with an embodiment of the present invention a method for shadow IT discovery, including monitoring an enterprise messaging service that provides communication between users belonging to the enterprise and cloud services, discovering a message relating to a specific cloud service, analyzing the discovered message to determine (i) the nature of the specific cloud service, and (ii) one or more enterprise users who use the specific cloud service, and reporting the results of the analyzing to an administrator of the enterprise.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

Table of elements in the figures

| Element | Description |
|---|---|
| 1-5 | employees of an organization |
| 100 | enterprise network |
| 110 | network traffic inspector |
| 150 | enterprise messaging service |
| 152-154 | messages |
| 200 | cloud |
| 210A-210C | cloud services |
| 300 | shadow IT discovery system |
| 310 | message monitor |
| 320 | message analyzer |
| 330 | reporter |

Elements numbered in the 1000's are operations of flow charts.

DETAILED DESCRIPTION

In accordance with embodiments of the present invention, systems and methods are provided for discovery and monitoring of cloud services used by people including inter alia employees, agents and contractors of an organization.

Figure 1:
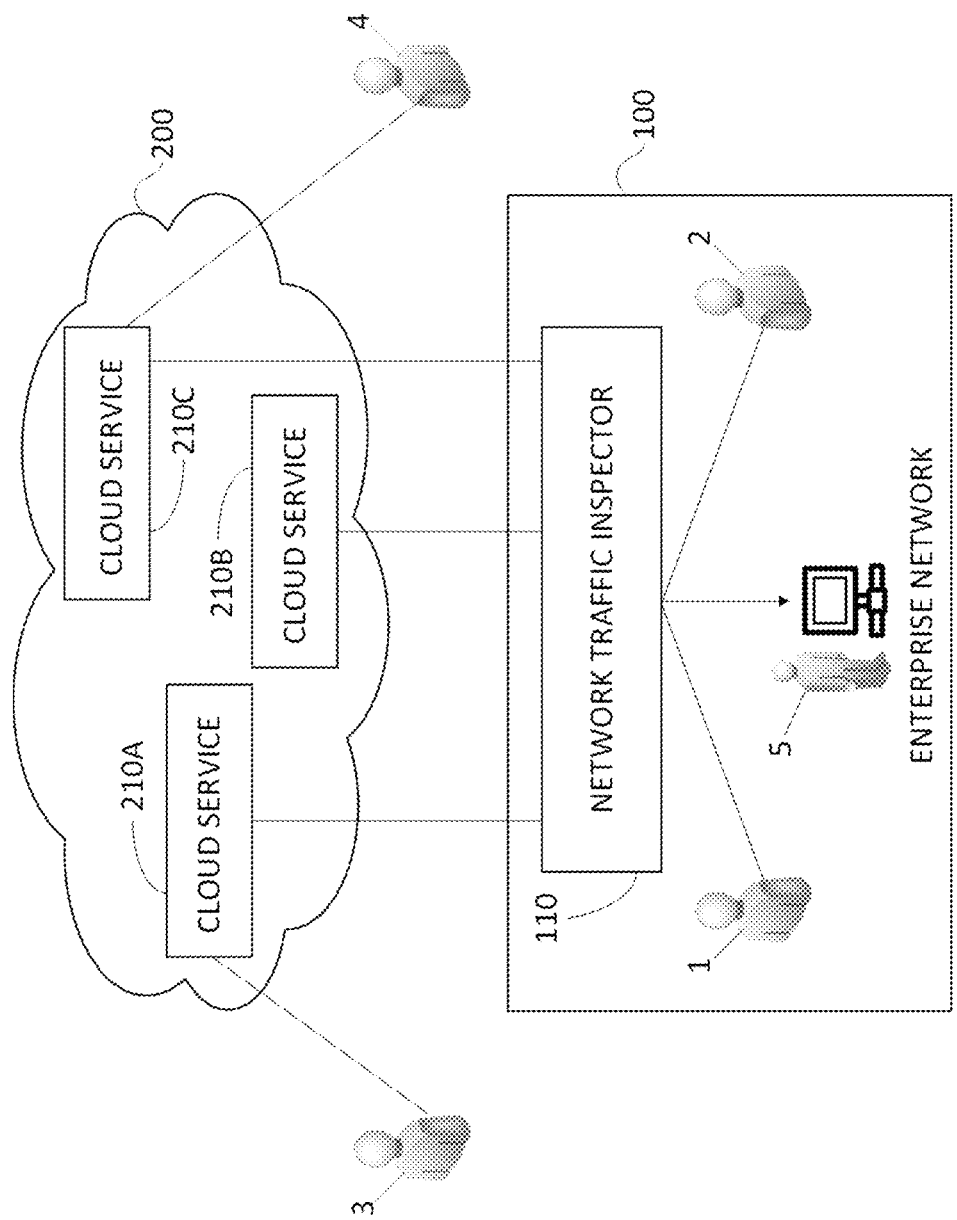
FIG. 1 is a prior art system for IT discovery.
Figure 2:
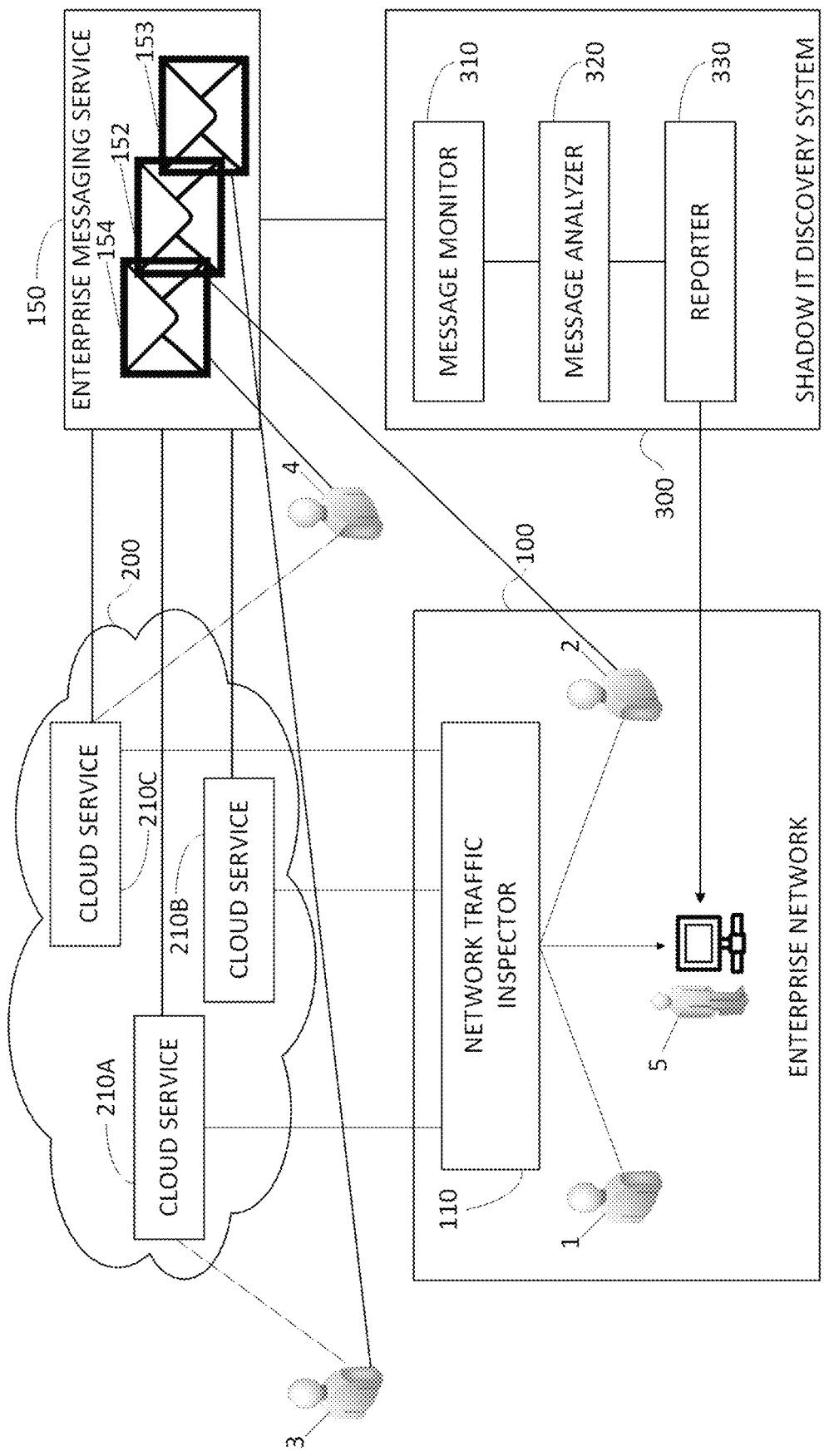
FIG. 2 is a system for shadow IT discovery, in accordance with an embodiment of the present invention.

Reference is made to FIG. 2, which is a system for shadow IT discovery, in accordance with an embodiment of the present invention. FIG. 2 shows enterprise network 100, network traffic inspector 110 and employees 1-5 of the organization. FIG. 2 also shows Internet cloud 200 and cloud services 210A, 210B and 210C. For example, cloud services 210A, 210B and 210C may include a collaborative document management service, such as OFFICE 365® developed by Microsoft Corporation of Redmond, Wash., a file sharing service, such as BOX.NET® developed by Box.net, Inc. of Palo Alto, Calif., and an e-mail service, such as GMAIL® developed by Google Inc. of Mountain View, Calif.

Employees 1, 2 and 5 are working within the organization or within virtual private networks of the organization, and their data traffic is indeed monitored by network traffic inspector 110. Employees 3 and 4, however, are accessing cloud-based services 210A, 210B and 210C directly from locations outside of the organization and, as such, escape monitoring by network traffic inspector 110.

FIG. 2 also shows an enterprise messaging system 150 such as an e-mail system, with messages 152, 153 and 154, and a shadow IT discovery system 300 including a message monitor 310, a message analyzer 320 and a reporter 330. Shadow IT discovery system 300 connects, via an application programming interface (API) and/or network protocols to enterprise messaging system 150.

Message monitor 310, message analyzer 320 and reporter 330 may be software modules or hardware modules under program control of a computer processor.

Message monitor 310 monitors messages for indications of cloud services. Thus when a user starts using a service such as salesforce.com, the user first registers with the service and receives an e-mail from the service authenticating the user's e-mail address and optionally sending the user a message welcoming him to the service. When certain events occur with cloud services, the user receives an e-mail advising him about the events. Message monitor 310 monitors enterprise message system 150 for presence of such messages.

When message monitor 310 discovers such a message, the message is forwarded to message analyzer 320 which then analyzes the message based on properties including inter alia meta-data, subject, content, links, headers, message destinations, and attachments. Message analyzer 320 also applies pattern-matching algorithms to analyze the message for presence of patterns indicating inter alia subscription to and usage of cloud services. Such in-depth inspection of a message itself and its meta-data reveals the type of usage, enabling granular shadow-IT discovery including sign-up date, first-user discovery and recent usage.

Thus message analyzer 320 may determine that user U is using cloud service S at time T. Message analyzer 320 may further determine additional information, including inter alia (i) if user U has administrator privilege for the cloud service, (ii) if the usage by user U is via a paid subscription or a trial subscription, (iii) existence of external users who collaborate with user U in use of service 5, (iv) the first user of the organization ("user-zero") who adopted cloud service S. (v) when cloud service S was first adopted, and (vi) the most recent use(s) of service S. Messages analyzer 320 identifies the nature of the usage of service 5, and the people who are collaborating with this usage. For example, message analyzer 320 may determine that an e-mail message from salesforce.com was received from a customer, that user U is using salesforce.com, and that a file from salesforce.com is being shared with another user V. Such information cannot be discovered by conventional discovery and monitoring solutions.

After message analyzer 320 analyzes a message, reporter 330 reports the results of the analysis to an administrator of the organization.

Message analyzer 320 may be programmed to detect specific alert trigger events, and reporter 330 may include a policy manager that automatically or manually performs specific actions, such as notifying an administrator or notifying user U, in response to detection of the alert triggers.

It will be appreciated by those skilled in the art that shadow IT discovery system 300 is not bound to limitations of conventional network traffic analysis. Shadow IT discovery system 300 is able to monitor any person who uses enterprise messaging system 150, and others who collaborate with that person, regardless of how that person connects to cloud services 210A, 210B and 210C, from where that person connects to cloud services 210A, 210B and 210C, and from which device that person connects to cloud services 210A, 210B and 210C. Shadow IT discovery system 300 may be located anywhere, inside or outside of enterprise network 100, and may even be located in the cloud. Shadow IT discovery system 300 may use API calls to remotely monitor enterprise messaging system 150 without actually accessing the network traffic itself.

It will be appreciated by those skilled in the art that shadow IT discovery system 300 is able to monitor enterprise messaging system 150, even when messaging system 150 is itself cloud-based.

Figure 3:
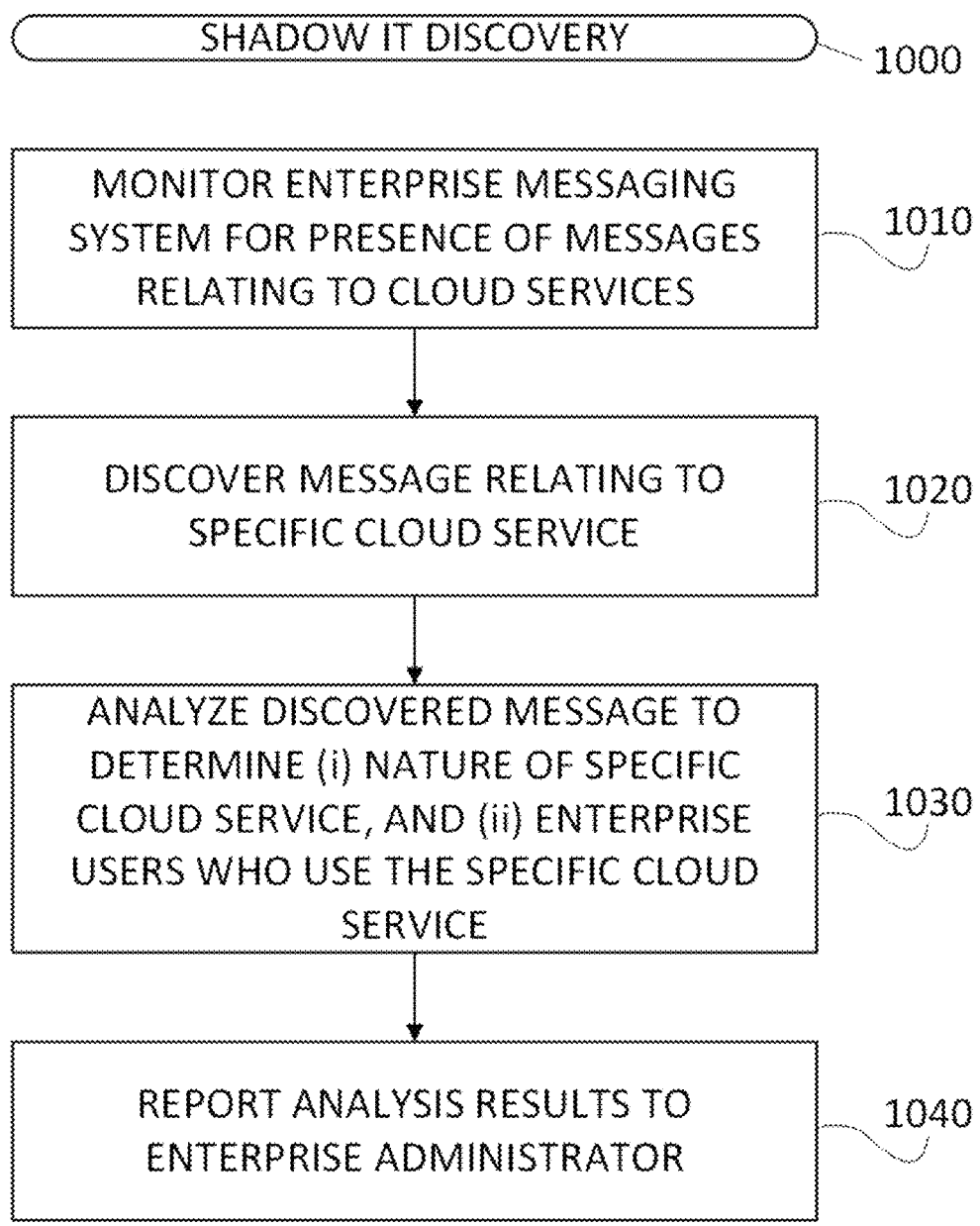
FIG. 3 is a method for shadow IT discovery, in accordance with an embodiment of the present invention.

Reference is made to FIG. 3, which is a method 1000 for shadow IT discovery, in accordance with an embodiment of the present invention. At operation 1010 message monitor 310 monitors enterprise messaging system 150 for presence of messages relating to cloud services. At operation 1020 message monitor 310 discovers a message relating to a specific cloud service. At operation 1030, message analyzer 320 analyzes the discovered message to determine inter alia the nature of the specific cloud service, and enterprise users who use the specific cloud service. As explained above, message analyzer 320 analyzes the discovered message based on properties including inter alia meta-data, subject, content, links and attachments. Message analyzer 320 also applies pattern-matching algorithms to analyze the message for presence of patterns indicating inter alia subscription to and usage of cloud services. At operation 1040, reporter 330 reports results of message analyzer to an enterprise administrator.

It will be appreciated by those skilled in the art that the systems and methods described above have the ability to discover and monitor all cloud-based services and applications used by employees of an organization. However, according to an embodiment of the present invention an administrator may apply a filter to restrict discovery and monitoring reports to non-sanctioned services and applications; i.e., to services and applications deemed to be shadow-IT. For example, a cloud-based service such as Box.net, or any cloud-based service discovered by message analyzer 320, may be tagged as an approved service, and filtered out of the discovery and monitoring reports generated by reporter 330.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A computer system for shadow IT discovery comprising:
   one or more computer processors controlling operation of a message monitor, a message analyzer and a reporter;
   a message monitor under control of said one or more computer processors, using application programming interface (API) calls to remotely monitor content of messages within an enterprise messaging service that provides communication between users belonging to the enterprise and cloud services, to discover a message welcoming a new registrant to a specific cloud service, or a message notifying a user of the specific cloud service that an event relating to the service has occurred, wherein the message monitor does not intermediate messages between the enterprise messaging service and the users;
   a message analyzer under control of said one or more computer processors, analyzing the message discovered by said message monitor to determine (i) the nature of the specific cloud service, (ii) one or more enterprise users who use the specific cloud service without having obtained approval from the enterprise, (iii) external users not belonging to the enterprise who are collaborating with users belonging to the enterprise via the specific cloud service, and (iv) whether an enterprise user has administrator privilege for the specific cloud service, based on the presence of patterns indicating subscription to and usage of the specific cloud service, and links and attachments of the message; and
   a reporter under control of said one or more computer processors, results of said message analyzer to an administrator of the enterprise.

2. A method for shadow IT discovery controlled by one or more computer processors, comprising:
   using application programming interface (API) calls to remotely monitor content of messages within an enterprise messaging service that provides communication between users belonging to the enterprise and cloud services, without intermediating messages between the enterprise messaging service and the users;
   discovering a message welcoming a new registrant to a specific cloud service, or a message notifying a user of the specific cloud service that an event relating to the service has occurred;
   analyzing the discovered message to determine (i) the nature of the specific cloud service, (ii) one or more enterprise users who use the specific cloud service without having obtained approval from the enterprise, (iii) external users not belonging to the enterprise who are collaborating with users belonging to the enterprise via the specific cloud service, and (iv) whether an enterprise user has administrator privilege for the specific cloud service, based on the presence of patterns indicating subscription to and usage of the specific cloud service, and links and attachments of the message;
   reporting the results of said analyzing to an administrator of the enterprise.

3. The method of claim 2 comprising further analyzing the discovered message to determine (iii) the first enterprise user to sign up to the specific cloud service, and (iv) a sign-up date when the first enterprise user signed up to the specific cloud service.

4. The computer system of claim 1 wherein said message analyzer analyzes meta-data of the message to determine a sign-up date, a first user, and recent usage of the specific cloud service.

5. The computer system of claim 1 wherein said message analyzer determines whether an enterprise user has a paid subscription or a trial subscription to the specific cloud service.

6. The method of claim 2 wherein said analyzing determines whether an enterprise user has a paid subscription or a trial subscription to the specific cloud service.

* * * * *